(12) United States Patent
Kida et al.

(10) Patent No.: US 6,970,227 B2
(45) Date of Patent: Nov. 29, 2005

(54) METHOD OF MANUFACTURING LIQUID CRYSTAL DISPLAY DEVICE

(75) Inventors: Tetsuya Kida, Kawasaki (JP); Satoshi Murata, Kawasaki (JP)

(73) Assignee: Sharp Corporation, Osaka (JP)

( * ) Notice: Subject to any disclaimer, the term of this patent is extended or adjusted under 35 U.S.C. 154(b) by 40 days.

(21) Appl. No.: 10/622,688

(22) Filed: Jul. 18, 2003

(65) Prior Publication Data

US 2004/0041976 A1 Mar. 4, 2004

(30) Foreign Application Priority Data

Aug. 30, 2002 (JP) .............................. 2002-253135

(51) Int. Cl.⁷ .......................................... G02F 1/1339
(52) U.S. Cl. .................................................... 349/190
(58) Field of Search ................................ 349/153, 190

(56) References Cited

U.S. PATENT DOCUMENTS 6,473,148 B1 * 10/2002 Suh .......................... 349/153
6,738,124 B2 * 5/2004 Park et al. ................. 349/153
2001/0015786 A1 * 8/2001 Katsura ..................... 349/153

FOREIGN PATENT DOCUMENTS

| JP | 08-106101 | 4/1996 |
|----|-----------|--------|
| JP | 11-326922 | 11/1999 |
| JP | 2001-222017 | 8/2001 |

* cited by examiner

*Primary Examiner*—Robert H. Kim
*Assistant Examiner*—Richard H Kim
(74) *Attorney, Agent, or Firm*—Greer, Burns & Crain, Ltd.

(57) ABSTRACT

A plurality of main seal patterns and dummy seal patterns are formed by a sealant on one of substrates. The plurality of main seal patterns individually enclose each of a plurality of display areas. The dummy seal patterns individually enclose the plurality of main seal patterns, and sides of the dummy seal patterns facing sides of the one substrate are all interconnected. These formations enable constant vacuum levels to be maintained the inside and the outside of the main seal patterns when the inside of a chamber of an assembling device is recovered to atmospheric pressure. Therefore, distortion of substrates is impeded in the vicinity of the main seal patterns, and degradation of display quality can be prevented.

9 Claims, 13 Drawing Sheets

METHOD OF MANUFACTURING LIQUID CRYSTAL DISPLAY DEVICE

CROSS-REFERENCE TO RELATED APPLICATIONS

This application is based upon and claims priority of Japanese Patent Application No. 2002-253135, filed on Aug. 30, 2002, the contents being incorporated herein by reference.

BACKGROUND OF THE INVENTION

1. Field of the Invention

The present invention relates to a method of manufacturing a liquid crystal display device by a one-drop-fill process, and more particularly to a method of manufacturing liquid crystal displays whereby the plurality of liquid crystal display devices are simultaneously formed by use of large substrates.

2. Description of the Prior Art

Liquid crystal display devices have been widely used for various kinds of electronic equipment since liquid crystal displays are thin and light and have merits of being driven with low voltage and consuming less electric power.

Common liquid crystal displays used for televisions and personal computers are constituted such that liquid crystals are enclosed between two transparent substrates disposed opposite each other. A pixel electrode and a thin film transistor (TFT) are formed on each pixel in one substrate, and color filters facing the pixel electrodes and a common electrode shared by each pixel are formed on the other substrate. Furthermore, polarizing plates are adhered to the opposite sides of the facing sides of each transparent substrate.

In the liquid crystal display device thus constituted, application of voltage between the pixel electrodes and the common electrode changes the directions of liquid crystal molecules located between the pixel electrodes and the common electrode. As a result, light transmittance changes. By controlling the light transmittance for each pixel, it is possible to display a desired image on the liquid crystal display device. Hereinafter, the substrate on which the pixel electrodes and the TFTs are formed is referred to as a TFT substrate, and the substrate on which the color filters and the common electrode are formed is referred to as a CF substrate.

There are two methods of enclosing liquid crystals between the TFT and the CF substrates, a vacuum infusion process and a one-drop-fill process. The advantage of the one-drop-fill process is that the operation time thereof is shorter than that of the vacuum infusion process.

FIGS. 1 to 3 are diagrams illustrating a method of manufacturing a liquid crystal display device by the one-drop-fill process. Note that columnar spacers which maintain uniform cell gaps are formed on the CF substrate in the examples below.

First, as shown in FIG. 1, a dispenser applies ultraviolet curing sealant 81 to make a quadrilateral frame shape as to enclose a display area of the TFT substrate 80. Thereafter, liquid crystals 82 are dropped in the area enclosed by the sealant 81. In this case, as shown in FIG. 1, liquid crystals 82 are dropped in a dispersed way on a plurality of spots in the area enclosed by the sealant 81. Note that the sealant 81 can be applied to both/either the TFT substrate or the CF substrate. In addition, the liquid crystals 82 are dropped either on the TFT substrate or on the CF substrate.

Second, as shown in FIG. 2A, a TFT substrate 80 and a CF substrate 85 are respectively attached to level blocks 91 and 92 in a chamber of a assembling device 90. In this example, since the liquid crystals 82 have already been dropped on the TFT substrate 80, the TFT substrate 80 is attached to the lower level block 91, and the CF substrate 85 is attached to the upper level block 92.

Third, as shown in FIG. 2B, the inside of the chamber of the assembling device 90 is evacuated. Thereafter, the TFT substrate 80 and the CF substrate 85 are temporarily glued with the sealant 81 by moving down the level block 92 (shown in FIG. 2C) after positioning the TFT substrate 80 and the CF substrate 85 by use of a camera (not shown). In this step, the liquid crystals 82 are spread in a space enclosed by the TFT substrate 80, the CF substrate 85 and the sealant 81. In addition, the resinous columnar spacers provided on the CF substrate 85 maintain a constant interval between the TFT substrate 80 and the CF substrate 85. Hereinafter, the structure constituted by bonding the TFT substrate 80 and the CF substrate 85 is referred to as a panel 87.

Fourth, as shown in FIG. 2D, the inside of the chamber of the assembling device 90 is recovered to atmospheric pressure to remove the panel 87. Thereafter, as shown in FIG. 2E, the panel 87 is irradiated with light from an ultraviolet (UV) lamp 88 to cure the sealant 81. Thus, the liquid crystals 82 are enclosed between the TFT substrate 80 and the CF substrate 85.

Incidentally, when removing the panel 87 from the assembling device 90, the sealant 81 is not cured yet. Accordingly, when recovering the inside of the chamber of the assembling device 90 to atmospheric pressure, the atmospheric pressure is quickly applied on the sealant 81, which is not cured. Consequently, when adhesion is insufficient between the sealant 81 and the TFT substrate 80 or the CF substrate 85, air enters inside the panel 87 from where the adhesion is insufficient and causes faulty display.

In addition, as shown in FIG. 3, when the inside of the chamber is recovered to the atmospheric pressure, downward force caused by the atmospheric pressure is applied to the area enclosed by the sealant 81. However, the downward force is not applied to the outside of the area enclosed by the sealant 81. Thus, although the cell gaps determined by the height of the spacers 86 are maintained in the area where the spacers 86 are provided, desired cell gaps cannot occasionally be maintained due to distortion of the substrate in the vicinity of the sealant 81 where the spacers 86 are not provided. This degrades the display quality in the vicinity of the sealant 81.

In order to prevent such a drawback to occur, double application of a sealant has been proposed in Japanese Patent Laid-Open Publication No. 11-326922.

When manufacturing a liquid crystal display, large-size glass substrates (termed mother glass substrates) have been generally used to simultaneously manufacture a plurality of liquid crystal display devices. In line with the shift to large-size liquid crystal display devices, there has been an increasing tendency for the size of recent mother glass substrates to be enlarged. If the mother glass substrates are enlarged, it is difficult to apply uniform pressure to the entire glass substrates due to insufficient parallelism between upper and lower level blocks of an assembling device. Consequently, adhesion between the sealant and the mother glass substrates is reduced.

For example, in a case where the method disclosed in Japanese Patent Laid-Open Publication No. 11-326922 is applied to the manufacture of liquid crystal display devices which employ large-size mother glass substrates, the sealant is applied as shown in FIGS. 4A and 4B. Hereinafter, patterns which enclose display areas and include a sealant disposed at closest positions of the display areas are referred to as main seal patterns, and patterns which include other sealant are referred to as dummy seal patterns. In FIG. 4A, each of two display areas of the mother glass substrate 95 is individually enclosed by the main seal pattern 96, and these main seal patterns 96 are enclosed by a dummy seal pattern 97, which is formed along the edge of the mother glass substrate 95. In FIG. 4B, each of the two display areas in the mother glass substrate 95 is individually enclosed by the main seal pattern 96, and these main seal patterns 96 are respectively enclosed by dummy seal patterns 98.

However, there is a possibility that the formation of the dummy seal pattern 97 as in FIG. 4A causes faulty display in both liquid crystal display device if adhesion between two mother substrates and the sealant constituting the dummy seal pattern 97 is insufficient. Moreover, the inventors of the present invention has proved in experiments that the formation of the dummy seal patterns 98 as in FIG. 4B is likely to cause insufficient adhesion of the sealant in the central portion (portion enclosed by a broken line in the drawing) of the mother glass substrate 95.

SUMMARY OF THE INVENTION

Based on the above description, an object of the present invention is to provide a method of manufacturing a liquid crystal display device whereby substrates are prevented from distorting when a pair of substrates is bonded with a sealant, and liquid crystal display devices with excellent display quality can be manufactured with high yield.

The aforementioned problems are solved by a method of manufacturing a liquid crystal display device characterized as follows: the method includes the steps of forming a plurality of main seal patterns and dummy seal patterns on one of a pair of substrates by a sealant, the main seal patterns individually enclosing each of a plurality of display areas, and the dummy seal patterns individually enclosing each of the plurality of main seal patterns and all sides of the dummy seal patterns facing sides of the one substrate being interconnected; dropping liquid crystals on one of the pair of the substrates; bonding the pair of the substrates in a vacuum atmosphere by the sealant which constitutes the main seal patterns and the dummy seal patterns; and curing the sealant which constitutes the main seal patterns and the dummy seal patterns.

For example, in the case where dummy patterns are constituted of a plurality of first dummy seal patterns which respectively enclose each of a plurality of main seal patterns, and one second dummy seal pattern which encloses all the plurality of first dummy seal patterns, vacuum is maintained inside the first dummy seal patterns enclosing the main seal patterns even though faulty adhesion occurs either in the sealant which constitutes the first dummy seal patterns or in the sealant which constitutes the second dummy seal pattern. This enables pressure to be applied to the entire inside of the first dummy seal patterns in a perpendicular direction with respect to a substrate when the pair of the substrates is exposed to atmospheric pressure again. Consequently, occurrence of distortion of substrates in the vicinity of the main seal patterns is impeded. As a result, faulty display due to distortion of the substrates is prevented, and manufacturing yield of liquid crystal display devices will improve.

In addition, for example, dummy seal patterns are constituted of a plurality of first dummy seal patterns and a plurality of second dummy seal patterns. The plurality of first dummy seal patterns respectively enclose individual main seal patterns, and the plurality of second dummy seal pattern interconnect between sides of the first dummy seal pattern facing sides of one substrate. Thereupon, when the inside of the chamber of the assembling device is recovered to atmospheric pressure, vacuum is maintained in the central portions of the substrates by the second dummy seal patterns. This also applies pressure to the central portions of the substrates in a vertical direction with respective to the substrates, and adhesion is improved between the substrates and the sealant which constitutes the first dummy seal patterns. As a result, faulty display due to distortion of the substrates is prevented, and thus manufacturing yield of liquid crystal displays is improved.

Furthermore, even if faulty adhesion occurs in one of the plurality of first dummy patterns, vacuum can be maintained inside the other first dummy seal patterns. Therefore, occurrence of faults can be limited to the minimum.

BRIEF DESCRIPTION OF THE DRAWINGS

FIG. 7A is a diagram illustrating a step of forming main seal patterns and dummy seal patterns. FIG. 7B is a diagram illustrating a step of dropping liquid crystals on a mother glass substrate. FIGS. 7C to 7G are diagrams illustrating steps of enclosing liquid crystals between the two mother glass substrates.

DESCRIPTION OF THE PREFERRED EMBODIMENTS

Hereinafter, embodiments of the present invention are described with reference to the attached drawings.

Figure 5:
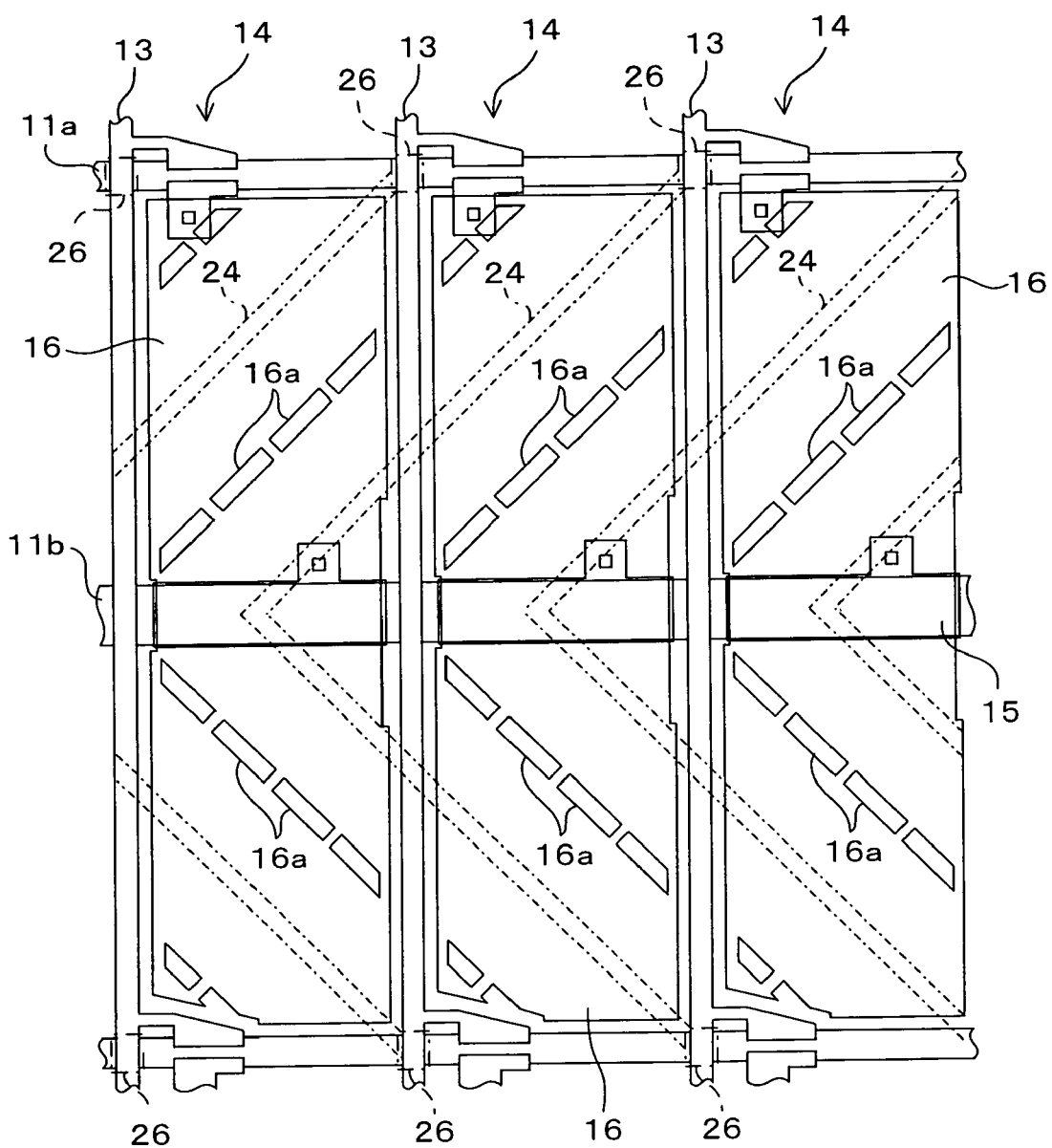
FIG. 5 is a plan view showing an example of a MVA liquid crystal display device.
Figure 6:
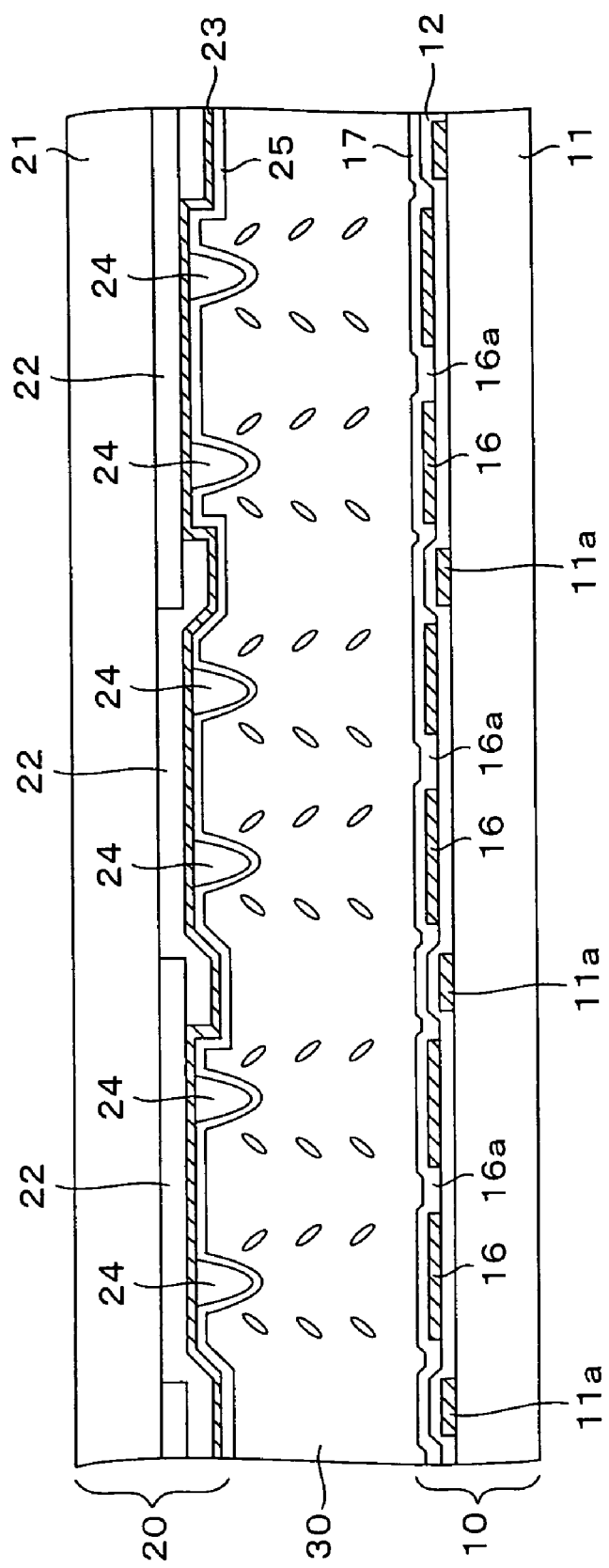
FIG. 6 is a schematic sectional view of the MVA liquid crystal display device.

(Liquid Crystal Display Device) FIG. 5 is a plan view showing an example of a multi-domain vertical alignment (MVA) liquid crystal display device, and FIG. 6 is a schematic sectional view of the MVA liquid crystal display device.

The liquid crystal display device has a constitution in which homeotropic liquid crystals 30 are enclosed between a TFT substrate 10 and a CF substrate 20. Additionally, polarizing plates (not shown) are respectively disposed beneath the TFT substrate 10 and atop the CF substrate 20. These polarizing plates are disposed so that polarization axes are made orthogonal to each other.

The TFT substrate 10 is composed of a glass substrate 11 on which gate bus lines 11a, auxiliary capacity bus lines 11b, data bus lines 13, TFTs 14, auxiliary capacity electrodes 15 and pixel electrodes 16 are formed. As shown in FIG. 5, the gate bus lines 11a are extended in a horizontal direction, and the data bus lines 13 are extended in a vertical direction. The gate bus lines 11a and the data bus lines 13 are electrically separated by an insulating film located between those lines. Individual areas sectioned by these gate bus lines 11a and data bus lines 13 are pixels. The auxiliary capacity bus lines 11b are formed in the same wiring layer of the gate bus lines 11a as to cross the central portions of the pixels.

In each pixel, the TFT 14, the pixel electrode 16 and the auxiliary capacity electrode 15 are formed. The TFT 14 is disposed in the vicinity of the position where the gate bus line 11a and the data bus line 13 intersect. A source electrode is electrically coupled to the pixel electrode 16, and a drain electrode is electrically coupled to the data bus line 13.

The auxiliary capacity electrode 15 is formed on the auxiliary capacity bus line 11b with the insulating film interposed therebetween. The auxiliary capacity electrode 15 is also electrically coupled to the pixel electrode 16.

The pixel electrode 16 is composed of a transparent conductor such as indium-tin oxide. As shown in FIG. 6, the pixel electrode 16 is formed on the insulating film 12 which covers the gate bus line 11a, the data bus line 13, TFT 14, the auxiliary capacity electrode 15 and the like. In this pixel electrode 16, domain restricting slits 16a are provided. As shown in FIG. 5, these slits 16a are provided along the zigzagged line on the gate bus line 11a and the auxiliary capacity bus line 11b. Moreover, a vertical alignment film 17 composed of polyimide and the like is formed on the pixel electrode 16.

Meanwhile, the CF substrate 20 is composed of a glass substrate 21 beneath which color filters 22 and a common electrode 23 are formed. There are three types of the color filters 22, red (R), green (G) and blue (B). One of the color filters 22, red (R), green (G) and blue (B), is disposed at a position facing the pixel electrode 16 of each pixel. In addition, the color filters 22 with different colors are layered at positions facing the gate bus lines 11a, the auxiliary capacity bus lines 11b, the data bus line 13 and the TFT 14 to block light.

The surfaces of the color filters 22 are covered with the common electrode 23, which is composed of a transparent conductor such as ITO. As shown in FIG. 6, the domain restricting protrusions 24 are formed beneath the common electrode 23 along the zigzagged lines on the gate bus lines 11a and the auxiliary capacity bus lines 11b. These protrusions 24 are formed by, for example, photoresist, and, as shown in FIG. 5, arranged between columns of the slits 16a of the pixel electrodes 16. The surfaces of these common electrode 23 and protrusions 24 are covered by the vertical alignment film 25.

Furthermore, as shown in FIG. 5, columnar spacers 26 which maintain uniform cell gaps are formed in the CF substrate 20 by photoresist at positions corresponding to the position where the gate bus lines 11a and the data bus lines 13 intersect.

(First Embodiment)

FIGS. 7A to 7G are diagrams illustrating a method of manufacturing liquid crystal displays in a first embodiment of the present invention. Herein, a case where two liquid crystal displays are simultaneously manufactured by use of mother glass substrates, known as a two-panels-per-sheet output, is described.

Figure 7A:
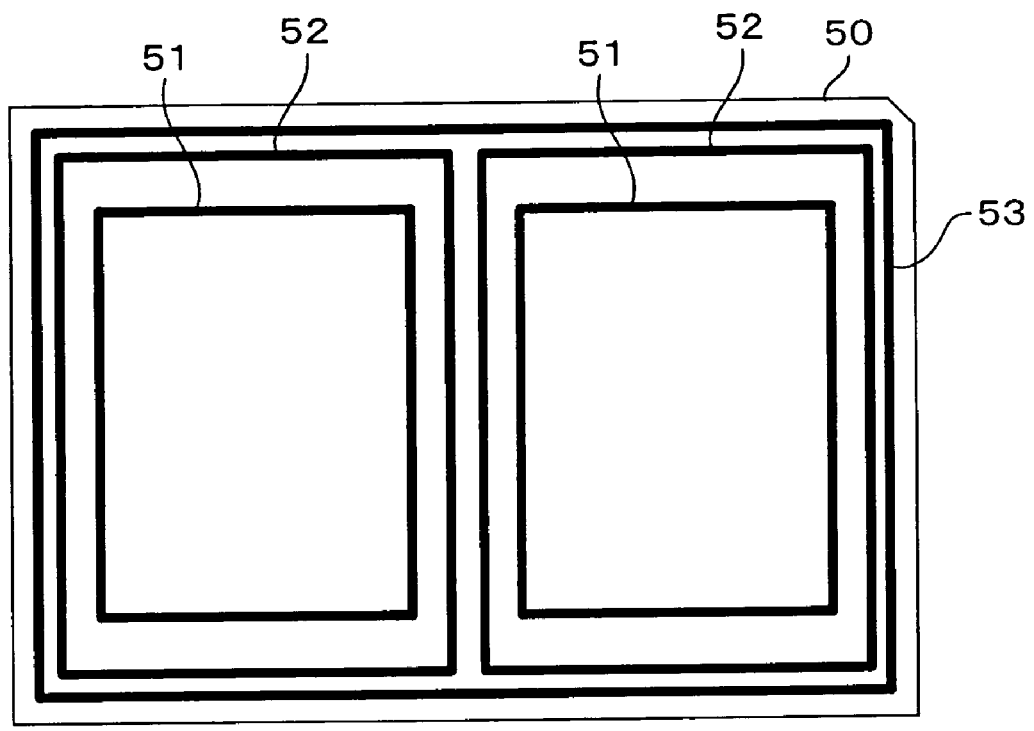
FIGS. 7A to 7G are diagrams illustrating a method of manufacturing a liquid crystal display device in a first embodiment of the present invention.
Figure 7B:
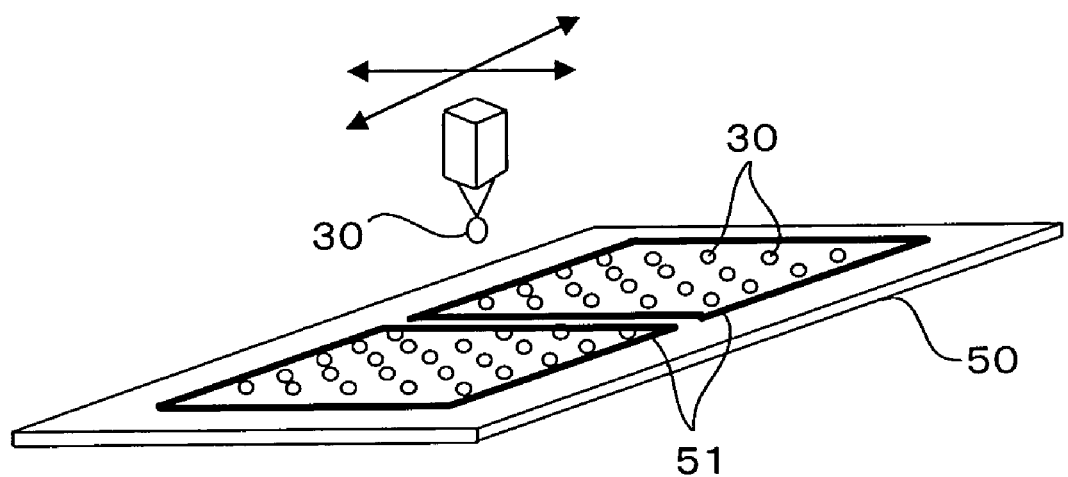

First, two mother glass substrates are prepared. As shown in FIGS. 7A and 7B, gate bus lines 11a, data bus lines 13, TFTs 14, pixel electrodes 16, alignment films 17 and the like are respectively formed in the right and left half areas in one of the mother glass substrates, which is to be a TFT substrate. In addition, color filters 22, common electrodes 23, protrusions 24, alignment films 25, columnar spacers 26 and the like are respectively formed in the right and left half areas in the other mother glass substrate, which is to be a CF substrate.

Subsequently, as shown in FIG. 7A, main seal patterns 51 which individually enclose each display area of liquid crystal display devices are formed on one of the mother glass substrates 50 by an ultraviolet curing sealant. These main seal patterns 51 can be formed, for example, by extruding the sealant from a dispenser as moving the dispenser relative to the mother glass substrate 50.

Next, first dummy seal patterns 52 are formed by an ultraviolet curing sealant to individually enclose each of the two main seal patterns 51. The interval between the main seal patterns 51 and the first dummy seal patterns 52 is set to, for example, 6 mm.

Second, a second dummy seal pattern 53 is formed by an ultraviolet curing sealant to simultaneously enclose the two first dummy seal patterns 52. The interval between the first dummy seal patterns 52 and the second dummy seal pattern 53 is preferably set narrower than the interval between the main seal patterns 51 and the first dummy seal patterns 52, for example, to 2 mm.

It is preferred that an ultraviolet curing sealant be used for the sealant which constitutes the main seal patterns 51 and the dummy seal patterns 52 and 53. Widths and heights of the main seal patterns 51 and the dummy seal patterns 52 and 53 are respectively set within a range from 200 to 500 $\mu$m and a range from 15 to 50 $\mu$m. These main seal patterns 51 and dummy seal patterns 52 and 53 do not have to be formed in the order described above. In addition, the main seal patterns 51 and dummy seal patterns 52 and 53 can be simultaneously formed by screen printing.

Thereafter, as shown in FIG. 7B, a dispenser drops homeotropic liquid crystals 30 on the mother glass substrate 50. Note that illustrations of the dummy seal patterns 52 and 53 are omitted in FIG. 7B.

In this case, it is preferred that the uniform amount of liquid crystals 30 be dropped inside the main seal patterns 51 at a constant interval. The drop amount of the liquid crystals 30 is determined by the size of a liquid crystal display device and cell gaps. For example, 5 mg of the liquid crystals 30 are dropped at 48 spots inside the main seal patterns 51 for a 15 inch liquid crystal display device.

Figure 7C:
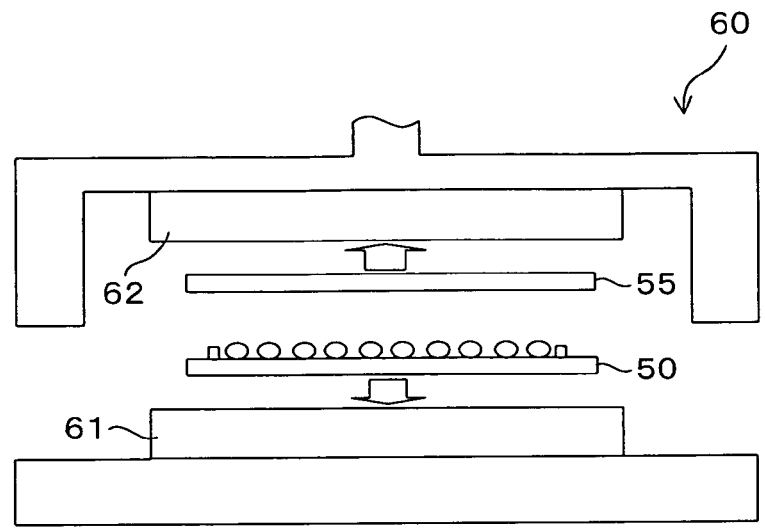

Next, as shown in FIG. 7C, the mother glass substrate 50 is attached to a lower level block 61 in an assembling device 60, and the mother glass substrate 55 on which the color filters 22, the common electrodes 23, the protrusions 24, the alignment films 25, the spacers 26 and the like are formed is attached to an upper level block 62.

Figure 7D:
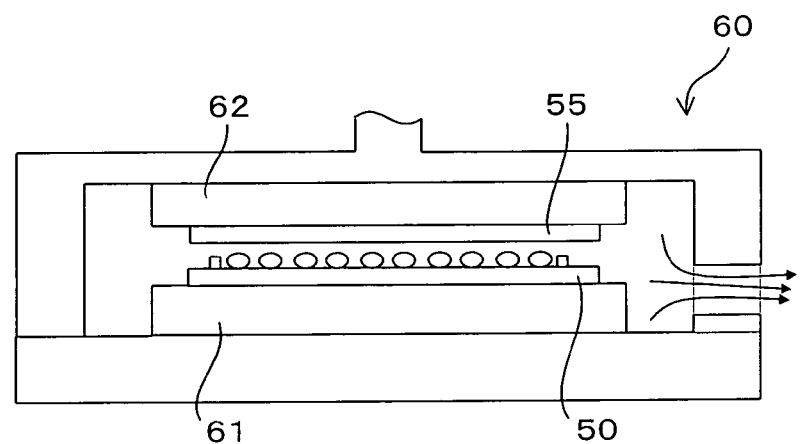

Subsequently, as shown in FIG. 7D, the chamber of the assembling device 60 is evacuated to be a pressure of approximately $1 \times 10^{-3}$ Torr. Thereafter, the upper mother glass substrate 55 and the lower mother glass substrate 50 are positioned by use of a camera (not shown). The positioning of the mother glass substrates 50 and 55 is performed with reference to positioning marks provided on both substrates 50 and 55.

Figure 7E:
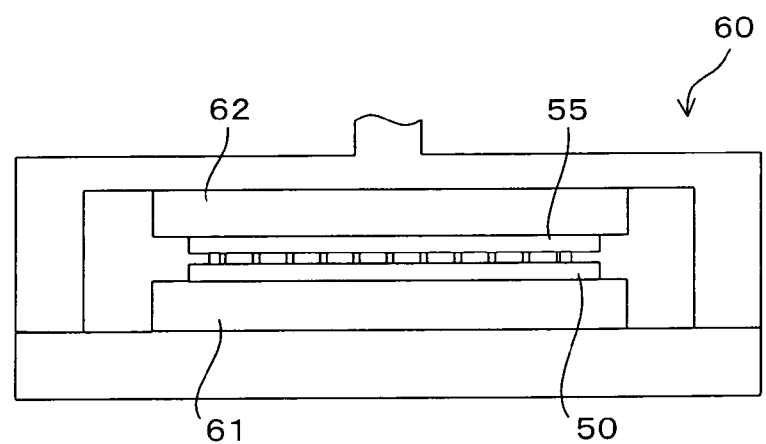

Next, as shown in FIG. 7E, the level blocks 61 and 62 are approached to each other to temporarily bond the mother glass substrates 50 and 55 with the sealant which constitutes the main seal patterns 51 and the dummy seal patterns 52 and 53. Consequently, the liquid crystals 30 spread inside the main seal patterns 51, and the liquid crystals 30 are enclosed in the space surrounded by the mother glass substrates 50 and 55 and the main seal patterns 51.

At this time, the mother glass substrate 55 is pressed onto the mother glass substrate 50 by applying pressure of, for example, 150 kgf, and the sealant which constitutes the mains seal patterns 51 and the dummy seal patterns 52 and 53 is firmly adhered to the mother glass substrates 50 and 51.

Figure 7F:
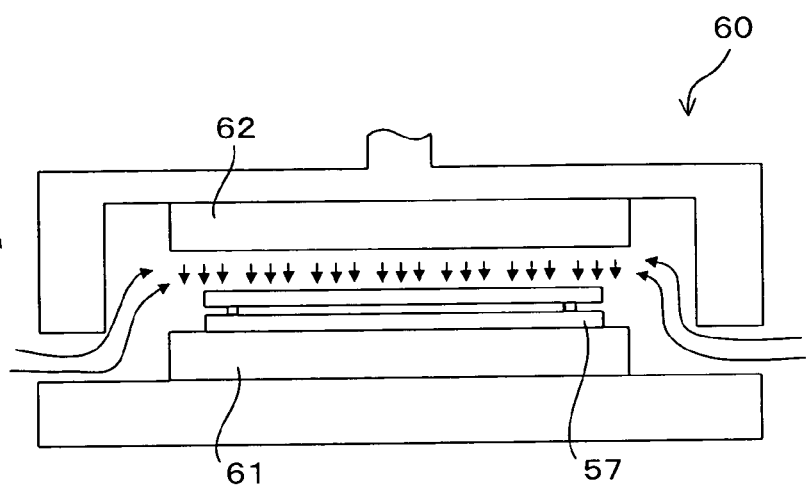

Third, as shown in FIG. 7F, air is led into the chamber of the assembling device 60 to have atmospheric pressure in the chamber, and thereby the upper mother glass substrate 55 is pressed onto the lower mother glass substrate 50. Thus, the mother glass substrates 55 and 50 maintain uniform cell gaps which are determined by the spacers 26 provided at positions where the gate bus lines 11a and the data bus lines 13 intersect. Hereinafter, the structure constituted by bonding the mother glass substrates 50 and 55 is referred to as a panel 57.

Figure 7G:
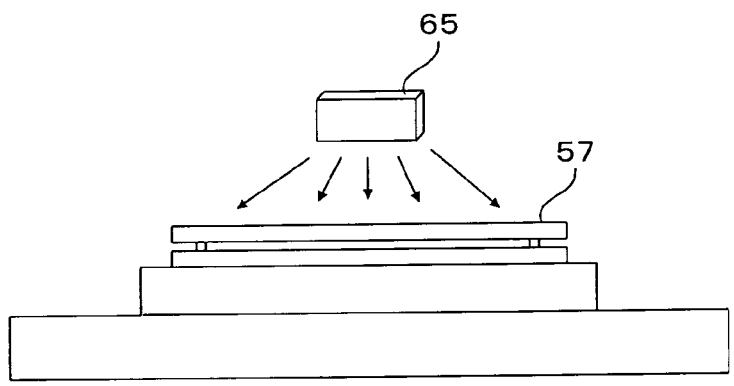

Subsequently, the panel 57 is removed from the assembling device 60 and, as shown in FIG. 7G, irradiated with light from an ultraviolet lamp 65 to cure the sealant which constitutes the main seal patterns 51 and the dummy seal patterns 52 and 53. Thereafter, the panel 57 is cut off and divided into two liquid crystal display devices. Thus, two liquid crystal display devices are simultaneously formed.

In the present embodiment, since the first dummy seal patterns 52 are provided outside the main seal patterns 51, vacuum is maintained inside the first dummy seal patterns 52 from the time that the mother glass substrates 50 and 55 are temporarily bonded with the sealant until the sealant is cured by ultraviolet light. As a result, when the inside of the chamber of the assembling device 60 is recovered to the atmospheric pressure, the forces applied to the inside and the outside of the main seal patterns 51 become the same level in a direction perpendicular to the panel 57. Accordingly, until the sealant is cured, distortion of the substrate is impeded in the vicinity of the main seal patterns 51, and the cell gaps are made uniform over the entirety of the display areas.

Figure 1:
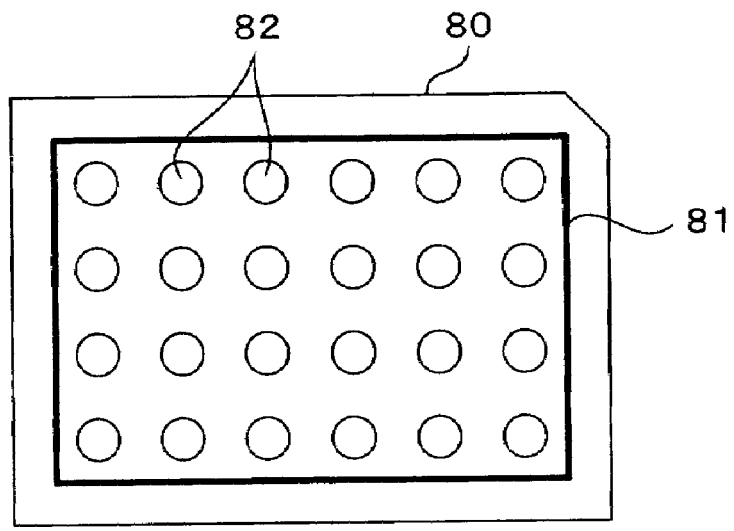
FIG. 1 is a diagram illustrating a method of manufacturing a liquid crystal display device by a conventional a one-drop-fill method. The diagram shows a shape of a main seal pattern.
Figure 3:
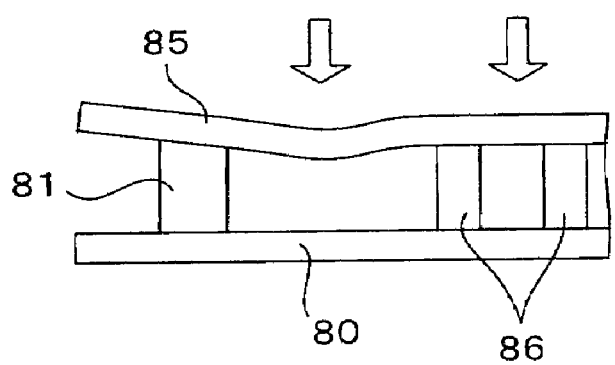
FIG. 3 is a diagram illustrating a problem in the conventional method of manufacturing a liquid crystal display device.
Figure 2A:
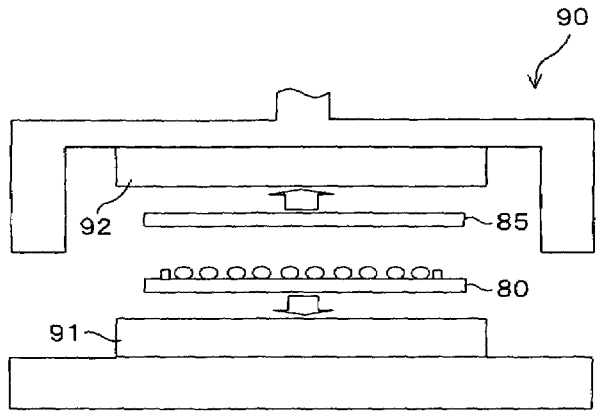
FIGS. 2A to 2E are diagrams illustrating a conventional method of manufacturing a liquid crystal display device. The diagrams show the steps of enclosing liquid crystals between two mother glass substrates.
Figure 2B:
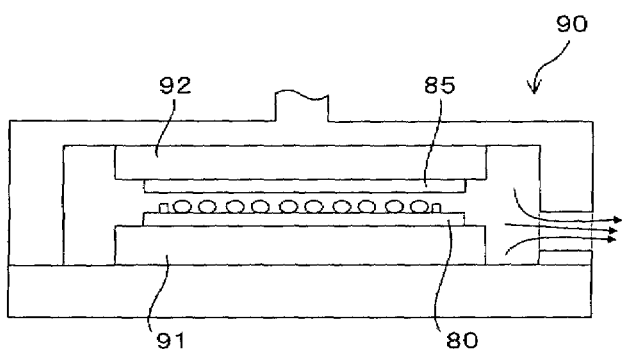
Figure 2C:
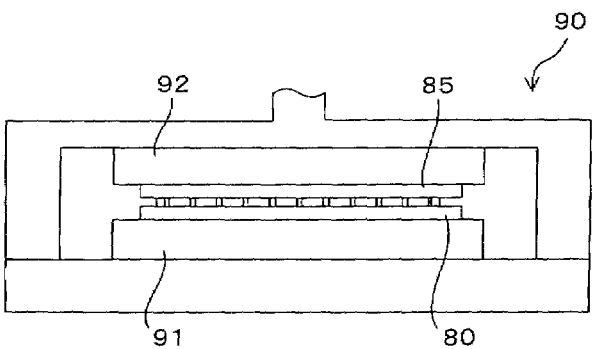
Figure 2D:
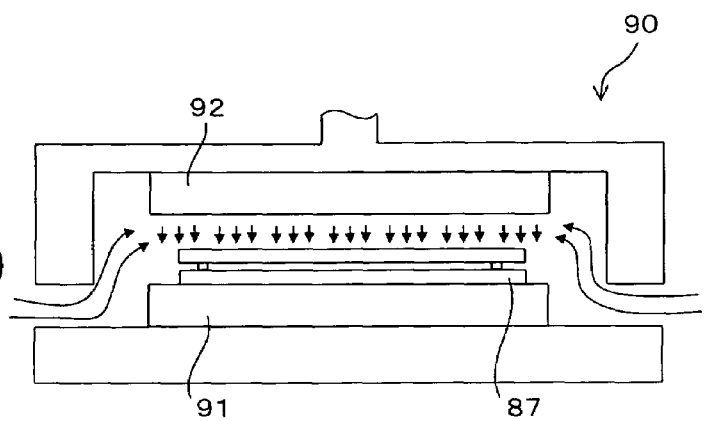
Figure 2E:
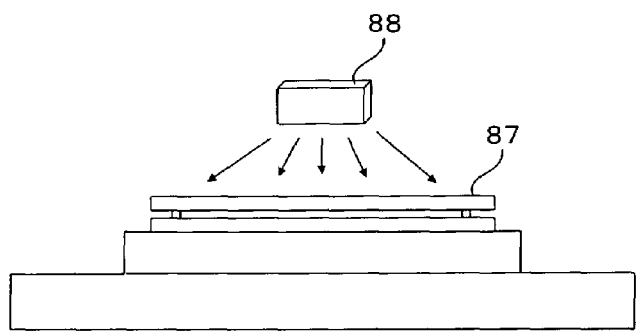

Even if adhesion is insufficient between the substrates 50 and 55 and the sealant which constitutes the first dummy seal patterns 52, the sealant which constitutes the second dummy seal patterns 53 maintains the same vacuum levels for the inside and the outside of the main seal patterns 51. Therefore, unlike in FIG. 3, the substrates will not be distorted in the vicinity of the main seal patterns 51.

Furthermore, even if the adhesion is insufficient between the substrates 50 and 55 and the sealant which constitutes the second dummy seal pattern 53, the sealant which constitutes the first dummy seal patterns 52 maintains the same vacuum levels for the inside and the outside of the main seal patterns 51. Therefore, the substrates will not be distorted in the vicinity of the main seal patterns 51.

As described above, in the present embodiment, even if faulty adhesion occurs in either the sealant which constitutes the first dummy seal patterns 52 or the sealant which constitutes the second dummy seal pattern 53, vacuum is maintained inside the first dummy seal patterns 52 which enclose the main seal patterns 51, and thereby degradation of display quality due to unevenness in the cell gaps is impeded. As a result, manufacturing yield of liquid crystal display devices is improved.

Note that, in a case where the interval is narrow between the main seal patterns 51 and the first dummy seal patterns 52, effects of providing the first dummy seal patterns 52 are reduced if the adhesion is insufficient between the mother glass substrates 50 and 55 and the sealant which constitutes the second dummy seal patterns 53. Consequently, the substrates distort in the vicinity of the main seal patterns 51, and this could possibly incur the degradation of the display quality. Accordingly, as previously mentioned, it is preferable that the interval between the main seal patterns 51 and the first dummy seal patterns 52 be larger than the interval between the first dummy seal patterns 52 and the second dummy seal patterns 53.

Figure 8A:
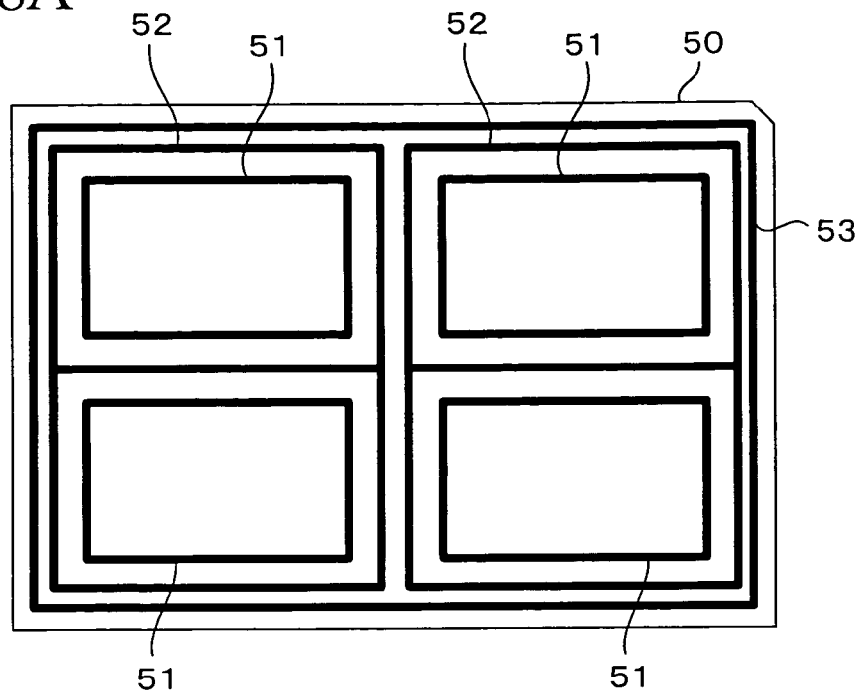
FIG. 8A is a diagram showing shapes of main seal patterns and the first and second dummy seal patterns when the first embodiment is applied to a four-panels-per-sheet output.
Figure 8B:
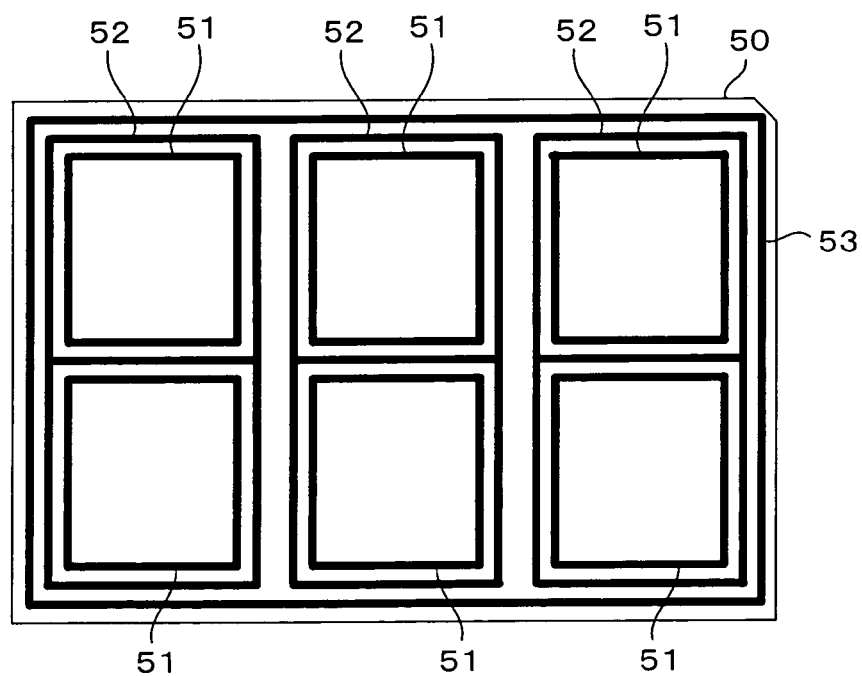
FIG. 8B is a diagram showing shapes of main seal patterns and the first and second dummy seal patterns when the first embodiment is applied to a six-panels-per-sheet output.

FIG. 8A is a diagram showing main seal patterns 51 and first and second dummy seal patterns 52 and 53 when the present embodiment is applied to a four-panels-per-sheet output. FIG. 8B is a diagram showing main seal patterns 51 and first and second dummy seal patterns 52 and 53 when the present embodiment is applied to a six-panels-per-sheet output.

For example, when the size of the mother glass substrate is set to 680 mm×880 mm, four 18 to 20-inch liquid crystal displays are simultaneously formed in the four-panels-per-sheet output, and six 15 to 16-inch liquid crystal displays are simultaneously formed in the six-panels-per-sheet output.

In these cases, each display areas of liquid crystal display devices each are double-enclosed by the main seal patterns 51 and the first dummy seal patterns 52. Furthermore, the second dummy seal pattern 53 is provided along the edge of the mother glass substrate 50. Thus, similar to the aforementioned two-panels-per-sheet output, distortion of the substrates can be prevented in the vicinity of the main seal patterns 51 even if the adhesion is insufficient between the mother glass substrates and the sealant which constitutes the dummy seal patterns 52 and 53. Therefore, liquid crystal display devices with good display quality can be manufactured with high yield.

Note that the main seal patterns 51 and the dummy seal patterns 52 and 53 can be formed on either/both mother glass substrates 50 and 55 although the main seal patterns 51 and the dummy seal patterns 52 and 53 are formed on the mother glass substrate 50 in the above embodiment. Moreover, the liquid crystals 30 can be dropped on the mother glass substrate 55 although the liquid crystals 30 are dropped on the mother glass substrate 50 on which the main seal patterns 51 and the dummy seal patterns 52 and 53 are formed in the present embodiment.

(Second Embodiment)

Figure 9A:
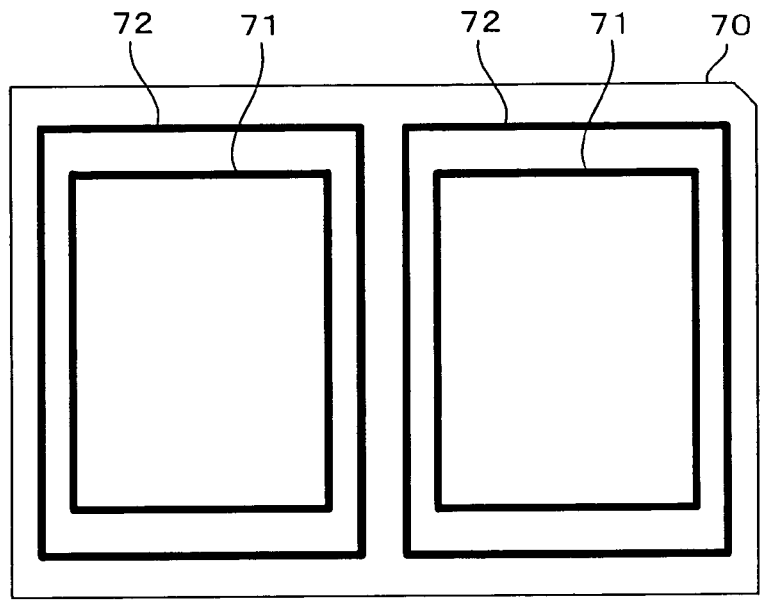
FIGS. 9A and 9B are diagrams illustrating a method of manufacturing a liquid crystal display device in a second embodiment of the present invention.
Figure 9B:
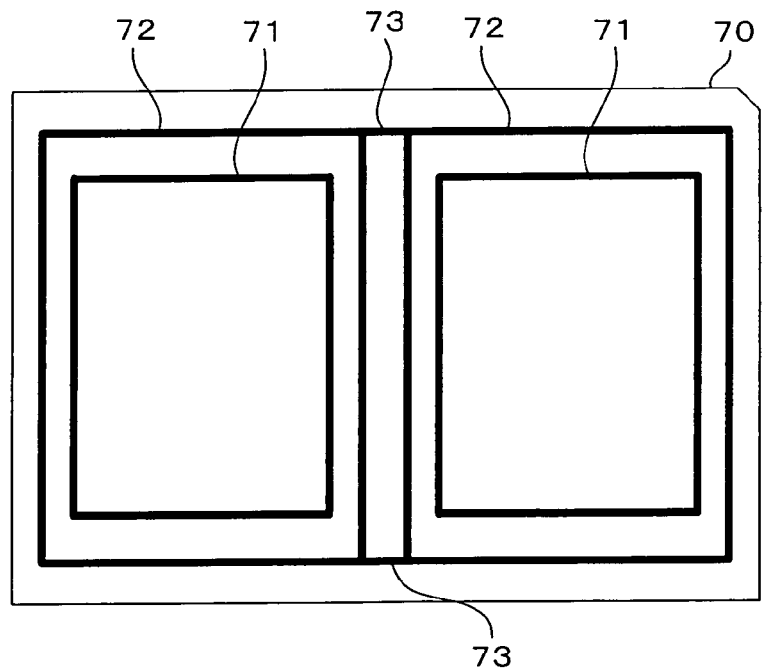

FIGS. 9A and 9B are diagrams illustrating a method of manufacturing a liquid crystal display device in a second embodiment of the present invention. Herein, a case of a two-panels-per-sheet output is described where two liquid crystal display devices are simultaneously formed by use of mother glass substrates. Note that the present embodiment is also described with reference to FIGS. 5 and 6.

First, two mother glass substrates are prepared. As shown in FIGS. 5 and 6, gate bus lines 11a, data bus lines 13, TFTs 14, pixel electrodes 16, alignment films 17 and the like are respectively formed in the right and left half areas in one of the mother glass substrates, which is to be a TFT substrate. In addition, color filters 22, common electrodes 23, protrusions 24, alignment films 25, columnar spacers 26 and the like are respectively formed in the right and left half areas in the other mother glass substrate, which is to be a CF substrate.

Second, as shown in FIG. 9A, main seal patterns 71 which individually enclose each display area of liquid crystal display devices are formed on one of the mother glass substrates 70 by an ultraviolet curing sealant. Moreover, first dummy seal patterns 72 which individually enclose each of the two main seal patterns 71 are formed by the ultraviolet curing sealant. The interval between the main seal patterns 71 and the first dummy seal pattern 72 is set to, for example, 6 mm.

Third, as shown in FIG. 9B, second dummy seal patterns 73 which interconnect the upper and lower sides of the two first dummy seal patterns 72 are formed by the ultraviolet curing sealant.

Widths and heights of these main seal patterns 71 and dummy seal patterns 72 and 73 are set to within a range from 200 to 500 $\mu$m and a range from 15 to 50 $\mu$m, respectively. Note that the main seal patterns 71 and the dummy seal patterns 72 and 73 do not have to be formed in the order described above. In addition, the main seal patterns 71 and the dummy seal patterns 72 and 73 can be simultaneously formed by means of screen printing and the like.

Thereafter, similar to the first embodiment, liquid crystals are dropped on the mother glass substrate 70 (refer to FIG. 7B). Subsequently, the one mother glass substrate 70 and the other mother glass substrate are temporarily bonded by use of an assembling device, and the sealant is irradiated with light from an UV lamp to be cured (refer to FIGS. 7C to 7G).

Figure 4A:
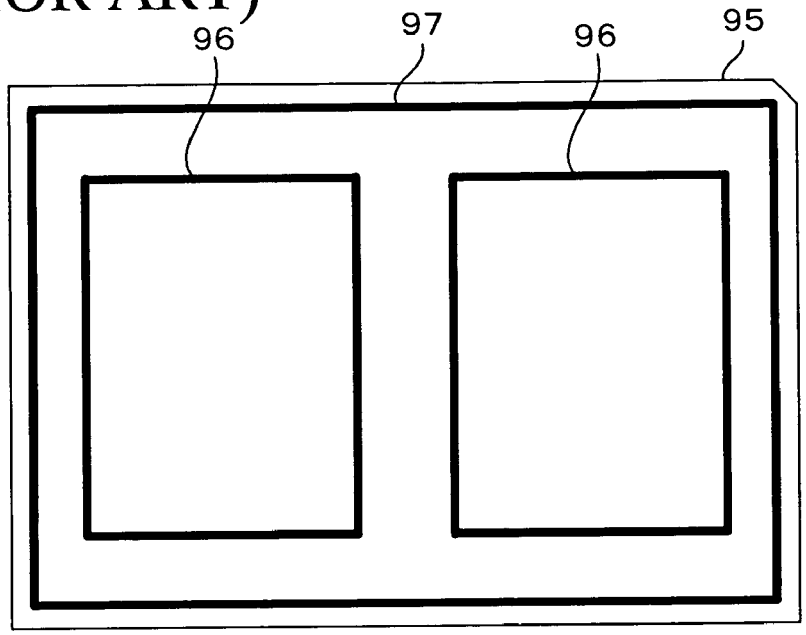
FIGS. 4A and 4B are diagrams showing examples of main seal patterns and dummy seal patterns in the conventional method of manufacturing a liquid crystal display device.
Figure 4B:
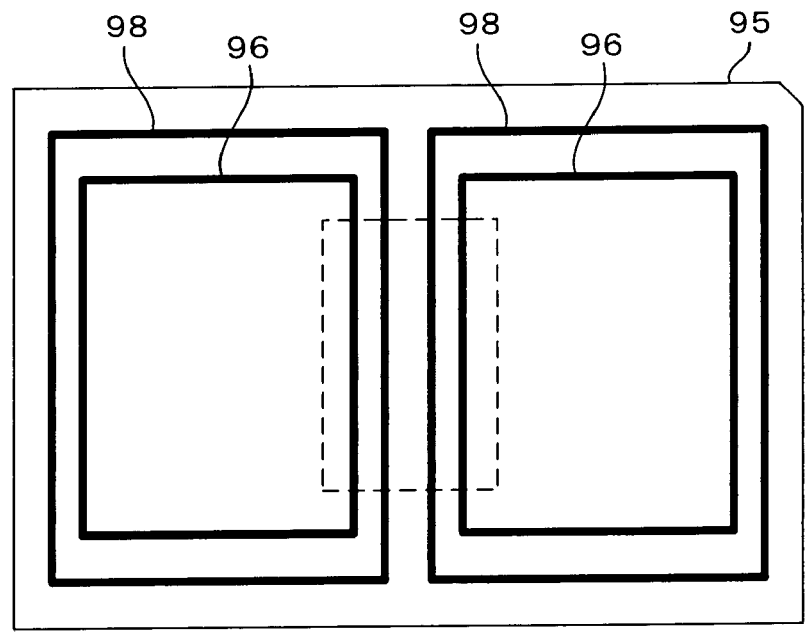

If the mother glass substrates are large in size, adhesion between the sealant and the mother glass substrates is apt to be reduced in the central portions of the substrates. As a result, when the dummy seal patterns are formed as shown in FIG. 4B, faulty adhesion of the sealant occurs in a portion indicated by a broken line in the diagram. This is considered to be a cause of degradation of display quality. However, in the present embodiment, a vacuum level is maintained in the central portions of the mother glass substrates by the second dummy seal patterns 73 from the time that the two mother glass substrates are temporarily bonded until the sealant is cured by ultraviolet light. Accordingly, when the inside of the chamber of the assembling device is recovered to atmospheric pressure, force is also applied to the central portions of the substrates in a vertical direction. Thus, the adhesion is improved between the mother glass substrates and the sealant which constitutes the first dummy seal patterns. Therefore, it is possible to manufacture a liquid crystal display without faulty display. Moreover, in the present embodiment, in a case where faulty adhesion occurs in the sealant of the first dummy seal patterns 72 there is a possibility that faulty display occurs due to distortion of the substrates in the other liquid crystal display device. However, since vacuum is maintained inside the first dummy seal patterns 72 in the other liquid crystal display device, occurrence of faulty display can be impeded.

Figure 10A:
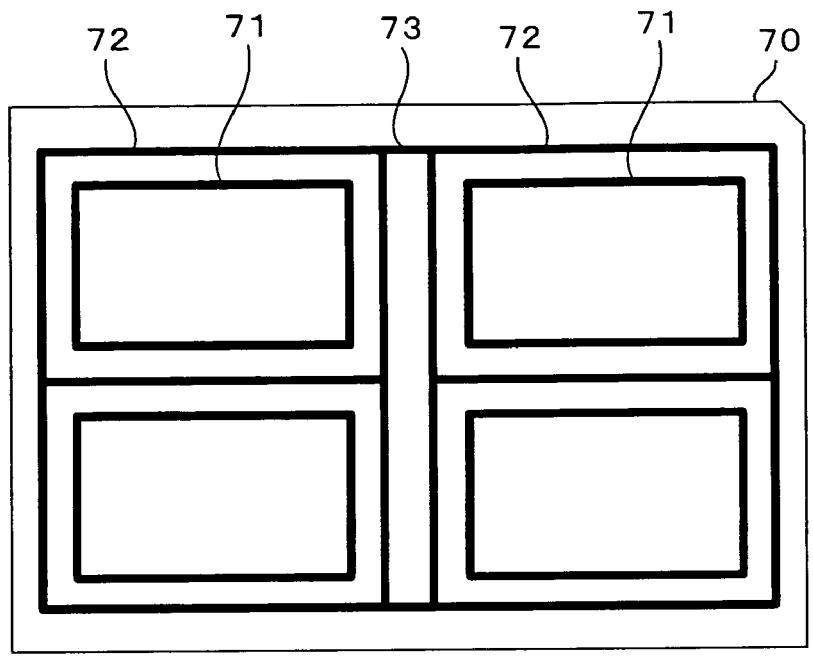
FIG. 10A is a diagram showing shapes of main seal patterns and the first and second dummy seal patterns when the second embodiment is applied to the four-panels-per-sheet output.
Figure 10B:
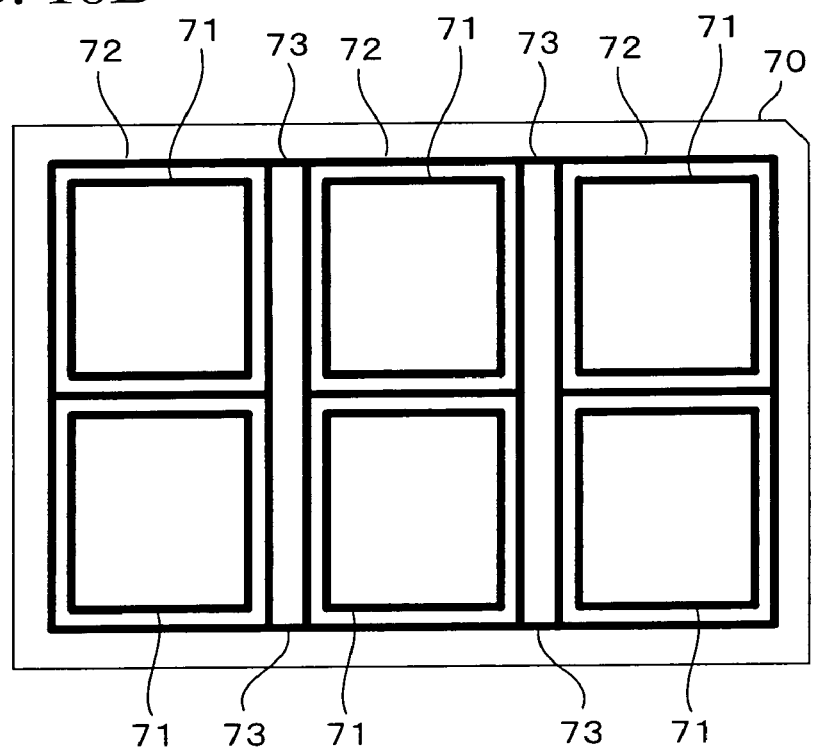
FIG. 10B is a diagram showing shapes of main seal patterns and the first and second dummy seal patterns when the second embodiment is applied to the six-panels-per-sheet output.

FIG. 10A is a diagram showing main seal patterns 71 and first and second dummy seal patterns 72 and 73 when the present embodiment is applied to the four-panels-per-sheet output. FIG. 10B is a diagram showing main seal patterns 71 and first and second dummy seal patterns 72 and 73 when the present embodiment is applied to the six-panels-per-sheet output.

In both four- and six-panels-per-sheet outputs, each display area of liquid crystal display devices is individually double-enclosed by both main seal patterns 71 and first dummy seal patterns 72. Furthermore, the second dummy seal patterns 73 are provided along the edge of the mother glass substrate 70 to interconnect the adjacent first dummy seal patterns 72. Similar to the aforementioned case of the two-panels-per-sheet output, this enables to manufacture a liquid crystal display device having good display quality with high yield.

Note that the main seal patterns 71 and the dummy seal patterns 72 and 73 can be also formed on either/both of the two mother glass substrates in the present embodiment. Moreover, in the present embodiment, the liquid crystals are dropped on the mother glass substrate on which the main seal patterns 71 and the dummy seal patterns 72 and 73 are formed. However the liquid crystals can be dropped on the mother glass substrate on which patterns are not formed by the sealant.

Furthermore, in the first and second embodiments described above, an explanation is given for an example where the present invention is applied to manufacture of a MVA liquid crystal display device. However, the present invention is not limited to a method of manufacturing the MVA liquid crystal display device. The present invention can be applied to manufacture of twisted nematic (TN) liquid crystal display devices, vertical alignment (VA) liquid crystal display devices, in-plane switching (IPS) liquid crystal display devices and the like.

What is claimed is:

1. A method of manufacturing a liquid crystal display device, comprising the steps of:
    forming a plurality of main seal patterns and dummy seal patterns on one of a pair of substrates by a sealant, the main seal patterns individually enclosing each of a plurality of display areas, and the dummy seal patterns individually enclosing each of the plurality of main seal patterns, all sides of the dummy seal patterns facing sides of the one substrate being interconnected along the edge of the one substrate;
    dropping liquid crystals on one of the pair of the substrates;
    bonding the pair of the substrates in a vacuum atmosphere by the sealant which constitutes the main seal patterns and the dummy seal patterns; and
    curing the sealant which constitutes the main seal patterns and the dummy seal patterns.

2. The method of manufacturing a liquid crystal display device according to claim 1, further comprising a second dummy seal pattern which encloses all the plurality of main seal patterns and dummy seal patterns.

3. The method of manufacturing a liquid crystal display device according to claim 2, wherein vacuum inside the plurality of the dummy seal patterns is maintained by the second dummy seal pattern from the time that the pair of the substrates are bonded with the sealant until the sealant is cured.

4. The method of manufacturing a liquid crystal display device according to claim 2, wherein an interval between the main seal patterns and the dummy seal patterns is larger than an interval between the dummy seal patterns and the second dummy seal pattern.

5. The method of manufacturing a liquid crystal display device according to claim 1, further comprising a plurality of second dummy seal patterns which individually interconnect between sides of the dummy seal patterns facing sides of the one substrate.

6. The method of manufacturing a liquid crystal display device according to claim 5, wherein vacuum in the portion between sides of the dummy seal patterns is maintained by the plurality of second dummy seal patterns from the time that the pair of the substrates are bonded with the sealant until the sealant is cured.

7. The method of manufacturing a liquid crystal display device according to claim 1, wherein an ultraviolet curing sealant is used as the sealant.

8. The method of manufacturing a liquid crystal display device according to claim 1, wherein spacers for maintaining uniform cell gaps are provided on one of the substrates.

9. The method of manufacturing a liquid crystal display device according to claim 1, wherein domain restricting protrusions are provided on at least one of the pair of the substrates.

* * * * *

UNITED STATES PATENT AND TRADEMARK OFFICE
CERTIFICATE OF CORRECTION

PATENT NO. : 6,970,227 B1
DATED : July 18, 2003
INVENTOR(S) : Tetsuya Kida et al.

It is certified that error appears in the above-identified patent and that said Letters Patent is hereby corrected as shown below:

<u>Title page,</u>
Item [73], Assignee, delete "Sharp Corporation" and insert -- Sharp Kabushiki Kaisha --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,970,227 B1 Page 1 of 1
DATED : November 29, 2005
INVENTOR(S) : Tetsuya Kida et al.

It is certified that error appears in the above-identified patent and that said Letters Patent is hereby corrected as shown below:

<u>Title page,</u>
Item [73], Assignee, delete "Sharp Corporation" and insert -- Sharp Kabushiki Kaisha --.

This certificate supersedes Certificate of Correction issued December 20, 2005.

Signed and Sealed this

Seventh Day of February, 2006

JON W. DUDAS
*Director of the United States Patent and Trademark Office*